(12) United States Patent
Fan (10) Patent No.: US 7,992,831 B2
(45) Date of Patent: Aug. 9, 2011

(54) BASE APPARATUS FOR DEVICE HOLDER

(76) Inventor: Eagle Fan, Hsinchu (TW)

( * ) Notice: Subject to any disclaimer, the term of this patent is extended or adjusted under 35 U.S.C. 154(b) by 545 days.

(21) Appl. No.: 12/115,647

(22) Filed: May 6, 2008

(65) Prior Publication Data

US 2009/0278015 A1    Nov. 12, 2009

(51) Int. Cl.
*A47B 91/00* (2006.01)
(52) U.S. Cl. ............... 248/205.5; 248/910; 248/346.01
(58) Field of Classification Search ............ 248/910, 248/500, 205.5, 206.2, 346.01
See application file for complete search history.

(56) References Cited

U.S. PATENT DOCUMENTS

| | | | | |
|---|---|---|---|---|
| 6,328,271 B1* | 12/2001 | Haage et al. | ............ | 248/288.31 |
| 6,371,345 B1* | 4/2002 | Leyden et al. | ............ | 224/553 |
| 6,397,046 B1* | 5/2002 | Kfoury | ............ | 455/90.1 |
| 6,439,530 B1* | 8/2002 | Schoenfish et al. | ...... | 248/346.06 |
| 7,682,543 B2* | 3/2010 | Carnevali | ............ | 264/255 |

* cited by examiner

*Primary Examiner* — Terrell McKinnon
*Assistant Examiner* — Steven Marsh
(74) *Attorney, Agent, or Firm* — Rabin & Berdo, P.C.

(57) ABSTRACT

A base apparatus for providing engagement to advice holder is provided, including a connection unit, a fixed unit, and at least a weight unit. The connection unit is for connecting a clapper or holder of electronic device, and the fixed unit is engaged to the bottom of the connection unit. The weight unit is sandwiched between and partially contained within the boundaries of the connection unit and the fixed unit. The weight unit includes a wrap means, an anti-slip means, and at least a weight object. The boundaries of the anti-slip means and the wrap means are engaged together to form a space for accommodating the weight object.

9 Claims, 10 Drawing Sheets

BASE APPARATUS FOR DEVICE HOLDER

FIELD OF THE INVENTION

The present invention generally relates to an apparatus for a support rod and a device holder used in a vehicle, and more specifically to a base apparatus with proper weight and anti-slip mechanism for connecting to a support rod or device holder for holding electronic devices.

BACKGROUND OF THE INVENTION

The support rod for holding device is a common auxiliary apparatus widely used in vehicles. When in use, the support rod must be connected to a holder. Some types of support rod for holding device are directly integrated to a holder. The support rod usually consists of a plurality of linked rods that can be adjusted to various positions. The holder is for holding the electronic devices commonly used in a vehicle, such as PDA, mobile phone, video player, GPS, digital TV, and so on. However, the support rod is still not a standard option for most manufactured vehicles. The current support rod usually is engaged to places, such as windshield, surface above the dash board, or cigarette lighter, so as to provide stable standing of the support rod.

There are disadvantages for the current mechanism used by the support rod for engaging to the vehicle:
1. Plugged into the cigarette lighter: the disadvantage is to damage the cigarette lighter;
2. glued to the surface above the dash board: difficult to remove and ruin the interior decoration of the vehicle; and
3. using sucker to attach to windshield: blocking the driver's view and possible to interfere with the safety; thus some places prohibits the use of such devices.

SUMMARY OF THE INVENTION

The primary object of the present invention is to provide a base apparatus for device holder or support rod used in vehicle. The base apparatus has a proper weight and can be placed on the flat surface above the dash board so that the base apparatus will stay unmoved even in a bumpy road condition. The device holder or support rod can be engaged to the base apparatus of the present invention so that the electronic device can be held by the device holder or the support rod connected to a clapper. The base apparatus can be picked up and moved to change the location of the device. The base apparatus of the present invention also avoids the aforementioned disadvantages of the conventional mechanism used by support rod or device holder to engage to the vehicle.

Another object of the present invention is to provide a base apparatus that has a wider range of applications. Instead of being directly glued or using sucker to attach to steady the device holder or support rod, the present invention relies on the weight and bottom surface to form a steady base. Therefore, in addition to vehicle, the present invention can also be used on the desk top or other flat surfaces so that the electronic devices can also be used in places other than in vehicle.

To achieve the above objects, the present invention provides a base apparatus, including a connection unit, a fixed unit, and at least a weight unit. The connection unit is for connecting a clapper or holder of electronic device, and the fixed unit is engaged to the bottom of the connection unit. The weight unit is sandwiched between and partially contained within the boundaries of the connection unit and the fixed unit. The weight unit includes a wrap means, an anti-slip means, and at least a weight object. The boundaries of the anti-slip means and the wrap means are engaged together to form a space for accommodating the weight object. The weight unit also forms an engagement segment on the contacting boundary region of the anti-slip means and the wrap means. The engagement segment is fixed between the fixed unit and the connection unit.

When there is a plurality of weight units, the weight units are uniformly distributed along the boundaries of the connection unit and the fixed unit in a pattern similar to the flower petals. However, the base apparatus can also arrange the weight units in a asymmetric manner in accordance with the application; in other words, more weight units are placed at a specific location while less weight units are placed at others.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
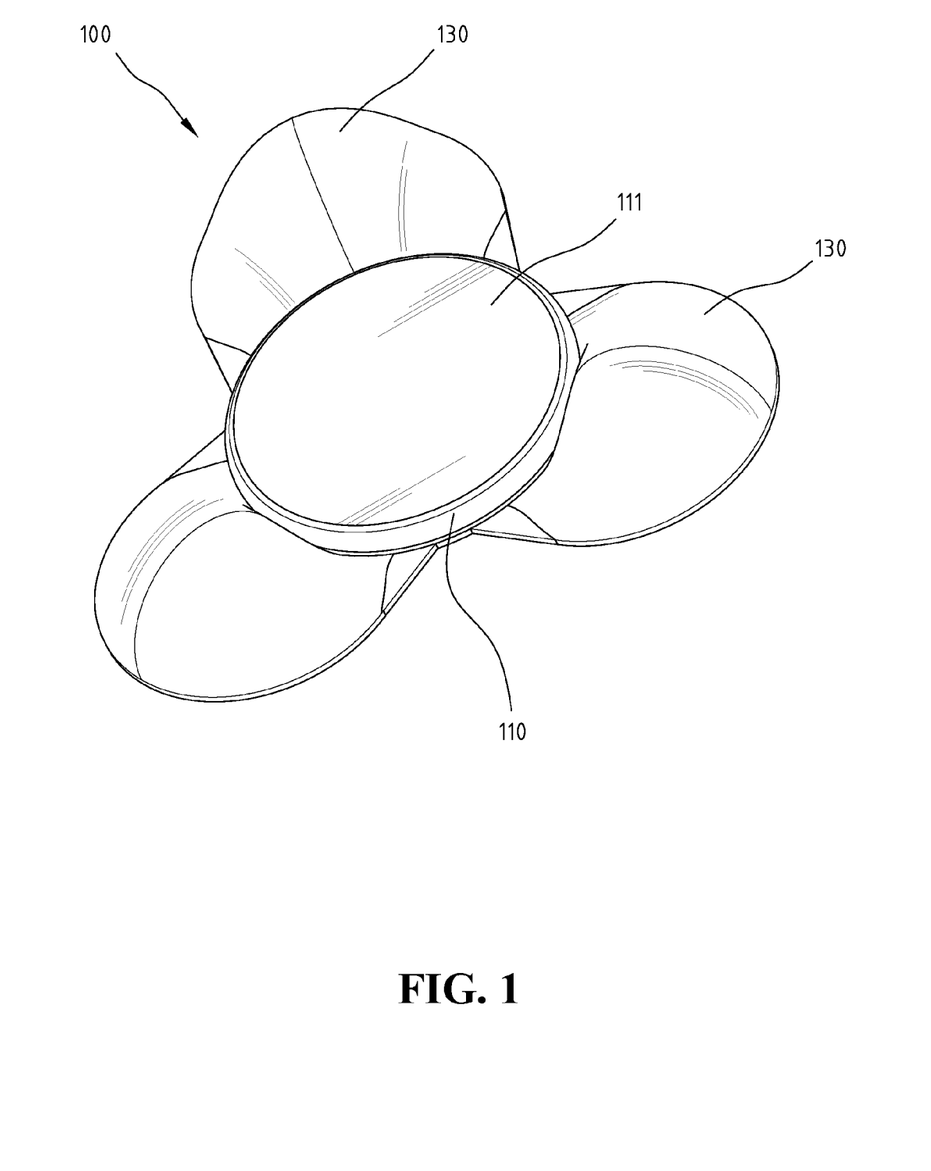
FIG. 1 shows a three-dimensional view of the first embodiment of the present invention.
Figure 2:
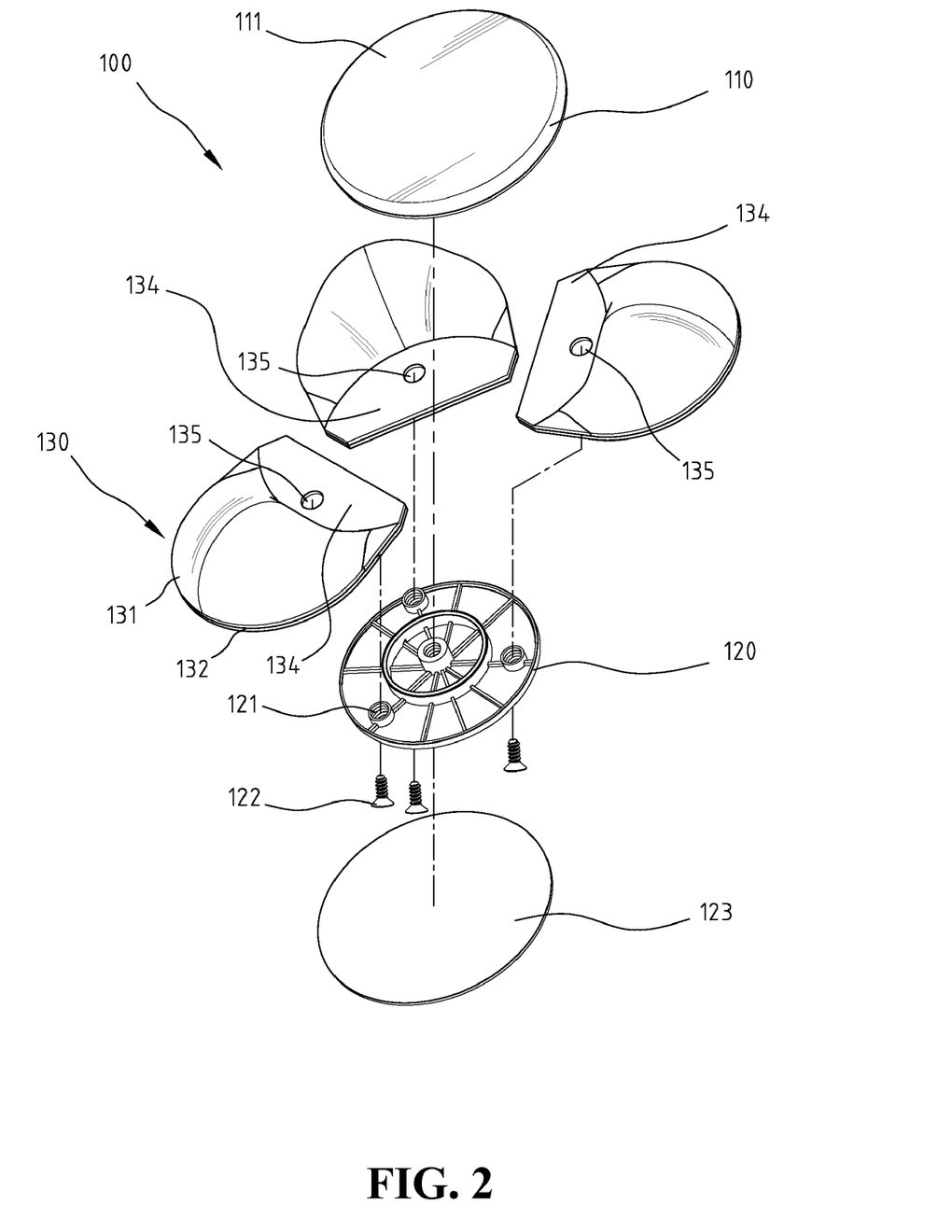
FIG. 2 shows an exploded view of the first embodiment of the present invention.

FIG. 1 and FIG. 2 show a three-dimensional view and an exploded view of a base apparatus for device holder or supporting rod of the present invention, respectively. A base apparatus 100 includes connection unit 110, a fixed unit 120, and at least a weight unit 130. Connection unit 110 is for connecting a device holder or clapper for holding an electronic device. Fixed unit 120 is engaged to the bottom of connection unit 110. Each weight unit 130 is sandwiched between and partially contained within the engaged boundaries of connection unit 110 and fixed unit 120 so that weight units 130 are distributed on the circumference of connection unit 110 and fixed unit 120. Therefore, when base apparatus 100 can be placed on a surface, the bottom of base apparatus 100 can snuggly hug the surface even when the surface is curvy. The device holder or clapper can also be connected to base apparatus 100 so that the electronic device can be placed on a surface through the device holder and base apparatus 100 of the present invention.

Figure 3:
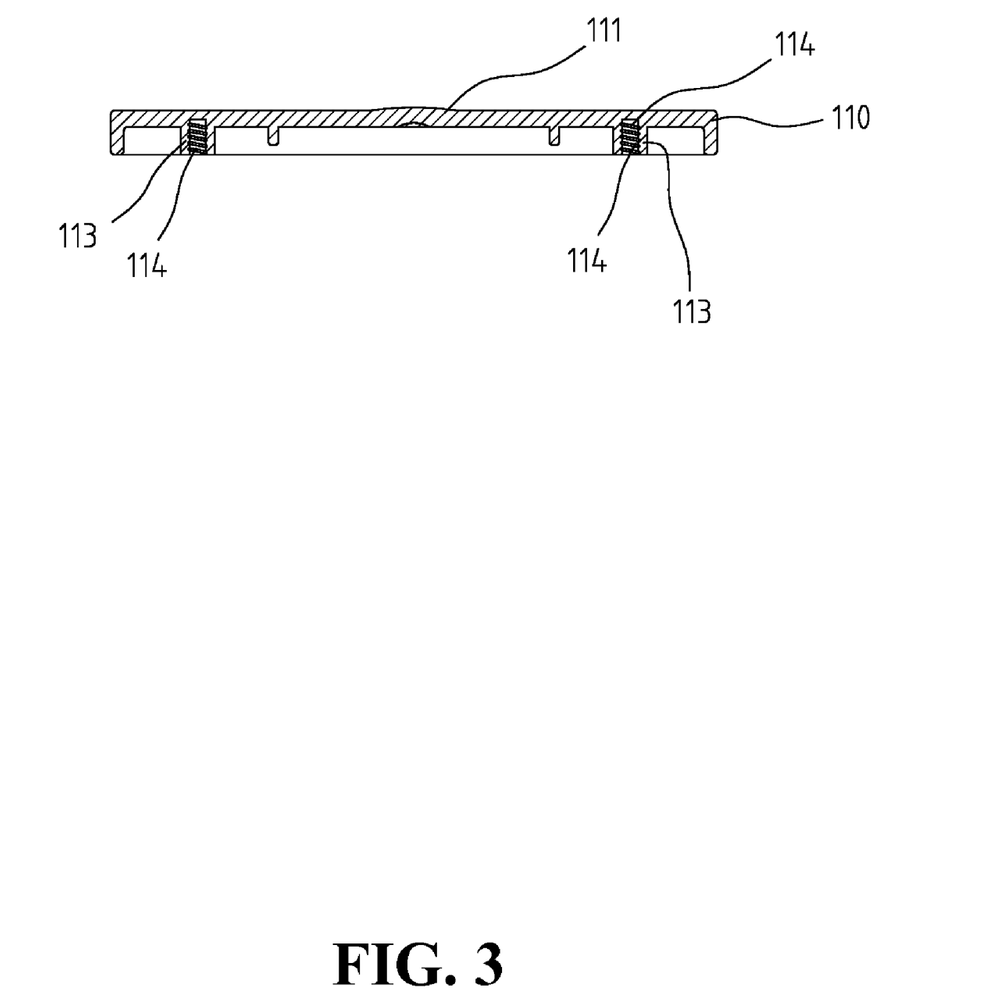
FIG. 3 shows a cross-sectional view of the connection unit of the first embodiment of the present invention.

The following describes the components in details. Connection unit 110 is for connecting a device holder. For example, a support rod can be attached, such as by sucker or other engagement means, to the connection unit. In the present embodiment, the upper surface of connection 110 is a smooth platform 111 for a sucker to attach on. As shown in FIG. 3, the lower part of connection unit 110 matches fixed unit 120. A plurality of alignment columns 113 is included to match weight units 130. In the present embodiment, the center of each alignment column 113 may further include a screw hole 114 for fastening fixed unit 120. However, alignment column 113 may also be designed to include no screw holes for fastening, but be only for alignment.

Figure 4:
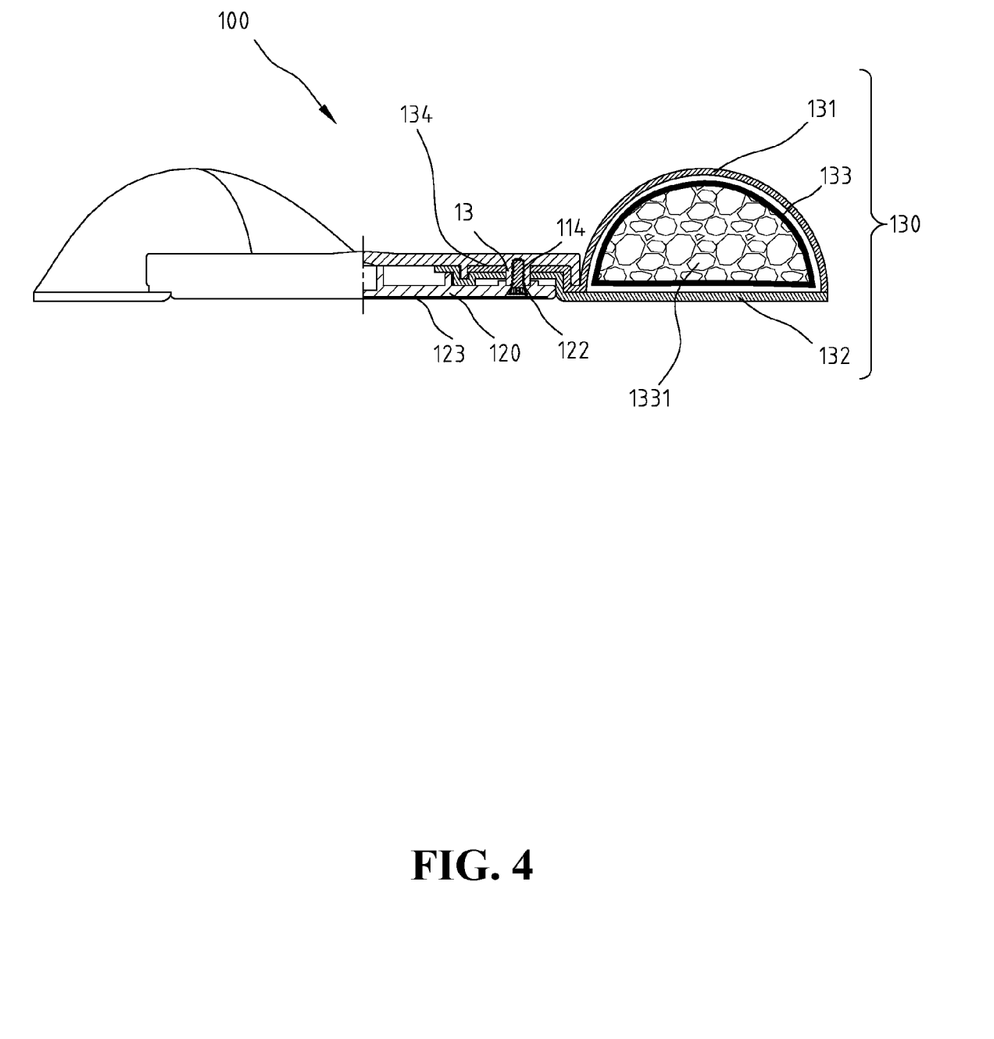
FIG. 4 shows a cross-section view of the first embodiment of the present invention.

The shape of fixed unit 120 should match the shape of the lower part of connection unit 110, but smaller in size. After being engaged to connection unit 110, fixed unit 120 maintains a small gap between its boundary and the boundary of connection unit 110. The small gap is for clamping weight units 130, as shown in FIG. 4. In the present embodiment, fixed unit 120 is shaped as a disc. Fixed unit 120 includes a plurality of via holes 121. The locations of via holes 121 correspond to the locations of alignment columns 113 of connection unit 110. Fixed unit 120 further includes a plurality of screws 122. Screws 122 are engaged, through via holes 121, to screw holes 114 of alignment columns 113 so as to engage connection unit 110 and fixed unit 120. The present invention is not limited to this type of engagement. Other types of engagement, such as using glue or rivets, are also within the scope of the present invention. Fixed unit 120 can further include an anti-slip patch 123 made of anti-slip material, such as soft anti-slip pad, anti-slip sticker. Anti-slip patch 123 is attached to the bottom of fixed unit 120 after screws 122 are engaged for esthetic purpose as well as for improving the anti-slip effect.

Figure 5:
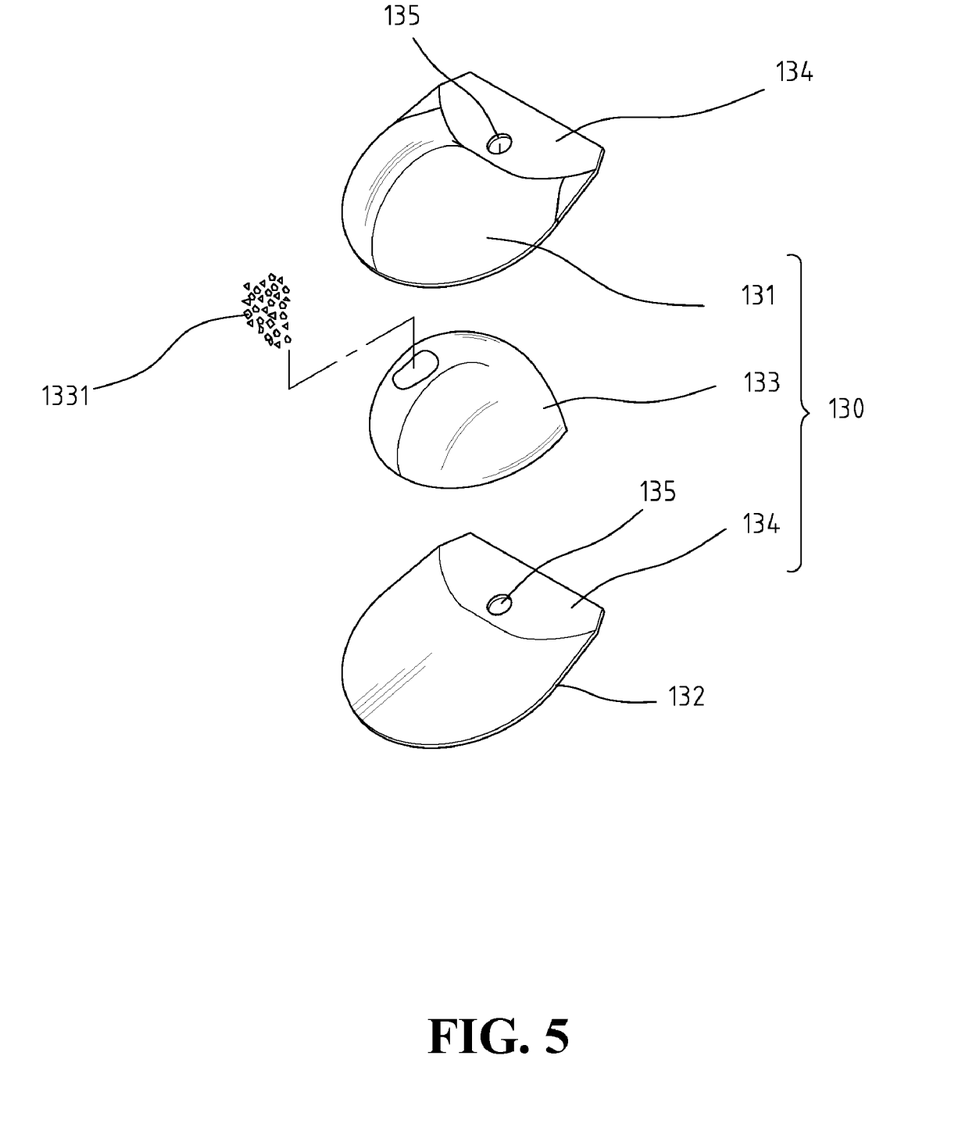
FIG. 5 shows an exploded view of the weight unit of the first embodiment of the present invention.

As shown in FIGS. 2 & 4, weight unit 130 is for increasing the bottom surface area of base apparatus 100 and lowering the center of mass so that base apparatus 100 will remain unmoved when placed on a surface. As shown in FIG. 5, weight unit 130 includes a wrap means 131, an anti-slip means 132 and at least a weight object 133. Wrap means 131 forms the upper part and anti-slip means is located at the bottom layer of weight unit 130. The majority of the boundaries of wrap means 1321 and anti-slip means 132 are stitched together forming a space to accommodate weight object 133. Anti-slip means 132 is made of soft anti-slip material, such as anti-slip cloth or material for scuba diving clothing. Anti-slip means 132, when in use, will deform in accordance with the pressure of weight object 133 and the contour of the surface base apparatus 100 is placed on. This deformation will increase the friction and the anti-slip effect. Weight unit 130 further includes an engagement segment 134, formed by a segment of the engaged boundaries of anti-slip means 132 and wrap means 131. During assembly, engagement segment 134 is clamped and fixed inside the rim of connection unit 110 and fixed unit 120. Engagement segment 134 further includes at least an alignment hole 135. Alignment hole 135 is formed at the location on wrap means 131 and anti-slip means 132 near the boundaries. During assembly, alignment column 113 of connection unit 110 is inserted into alignment hole 135.

Weight object 133 is a material of considerable weight, such as gravel, sand, iron powder or iron blocks. For the ease of manufacturing, weight object 133 of the present invention is a bag containing heavy powder or grains 1331, such as sand, gravel, iron block, iron powder, at any combination of the above.

The following describes the assembly. Prior to assembly, the boundaries of wrap means 131 and anti-slip means 132 of weight unit 130 are sewed together, with engagement segment 134 remaining un sewed. Weight object 133 is placed into the space formed by wrap means 131 and anti-slip means 132 through engagement segment. A plurality of weight units 130 is arranged to surround connection unit 110. Engagement segment 134 is placed on the inner side of the bottom of connection unit 110 so that alignment column 135 is inserted into alignment hole 135 for alignment and temporary fastening. Then, fixed unit 120 is placed under connection unit 110. The boundary of fixed unit 120 presses against engagement segment 134 of weight unit 130. Screw 122 is then used to engage fixed unit 120 and connection unit 110 with weight unit 130 clapped by fixed unit 120 and connection unit 110. Finally, anti-slip patch 123 is attached to the bottom of fixed unit 120 to improve both esthetics and effectiveness.

Figure 6:
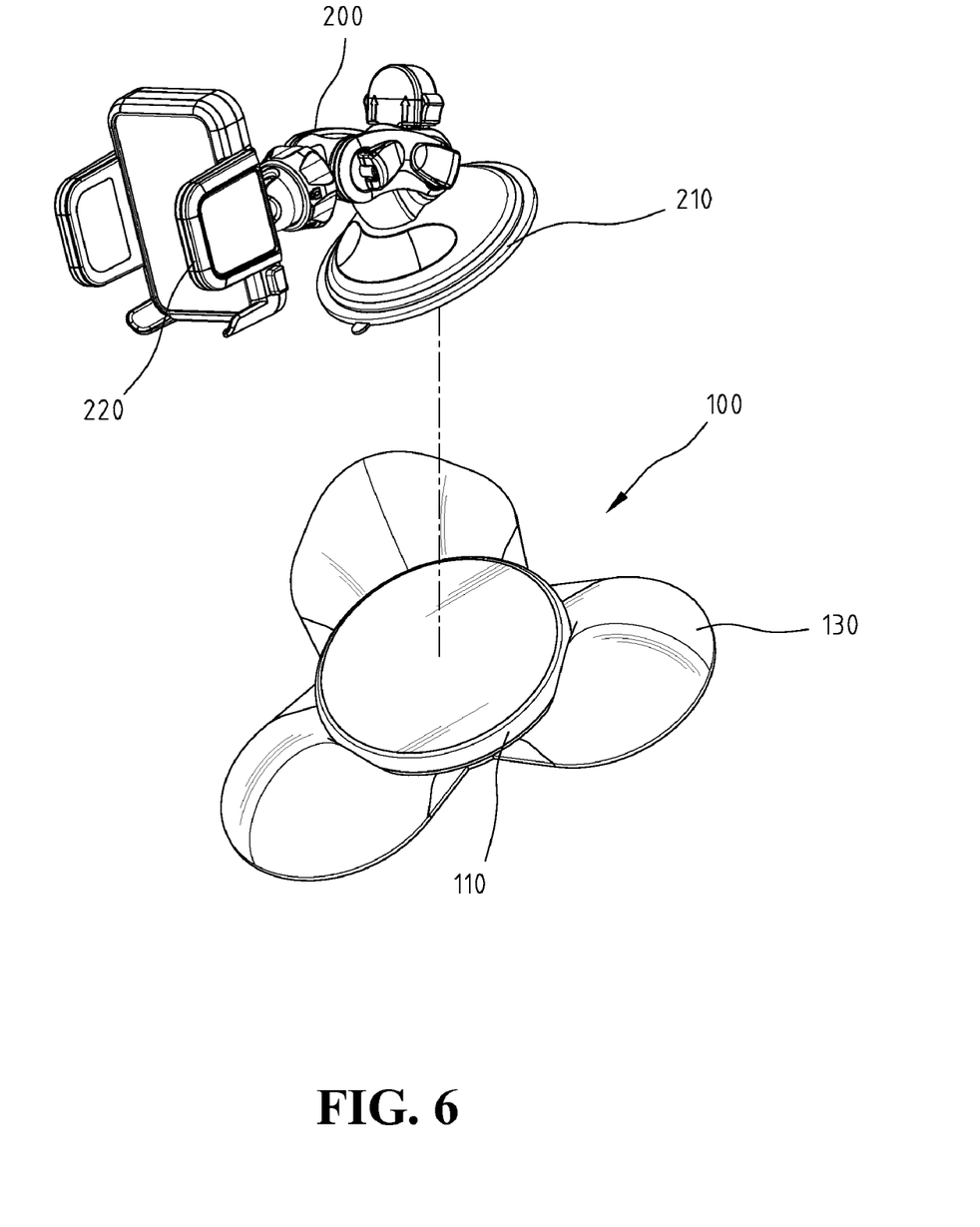
FIG. 6 shows an actual application of the first embodiment of the present invention.

FIG. 6 shows a schematic view of the present invention in actual application. A plurality of weight units 130 is distributed surrounding connection unit 110. Base apparatus 100 is to provide a flat platform 111 for connecting a support rod 200 with a sucker 210. Support rod 200 uses sucker 210 to attach to flat platform 111 and uses clapper 220 to clap the electronic device. Because weight units 130 have considerable amount of weight and the bottom layer of weight units 130 are anti-slip means 132 so that when base apparatus 100 is placed on top of the dashboard of a car, base apparatus 100 will remain stable and unmoved. In addition, anti-slip means 132 will deform due to the pressure of weight objects 133 so as to conform to the contour of the top of the dashboard to increase the anti-slip effect. This embodiment shows a round connection unit 110 and three weight units 130. However, the present invention is not limited to such an embodiment. For example, three to six weight units can be arranged like petals of flowers around connection unit 110.

Figure 7:
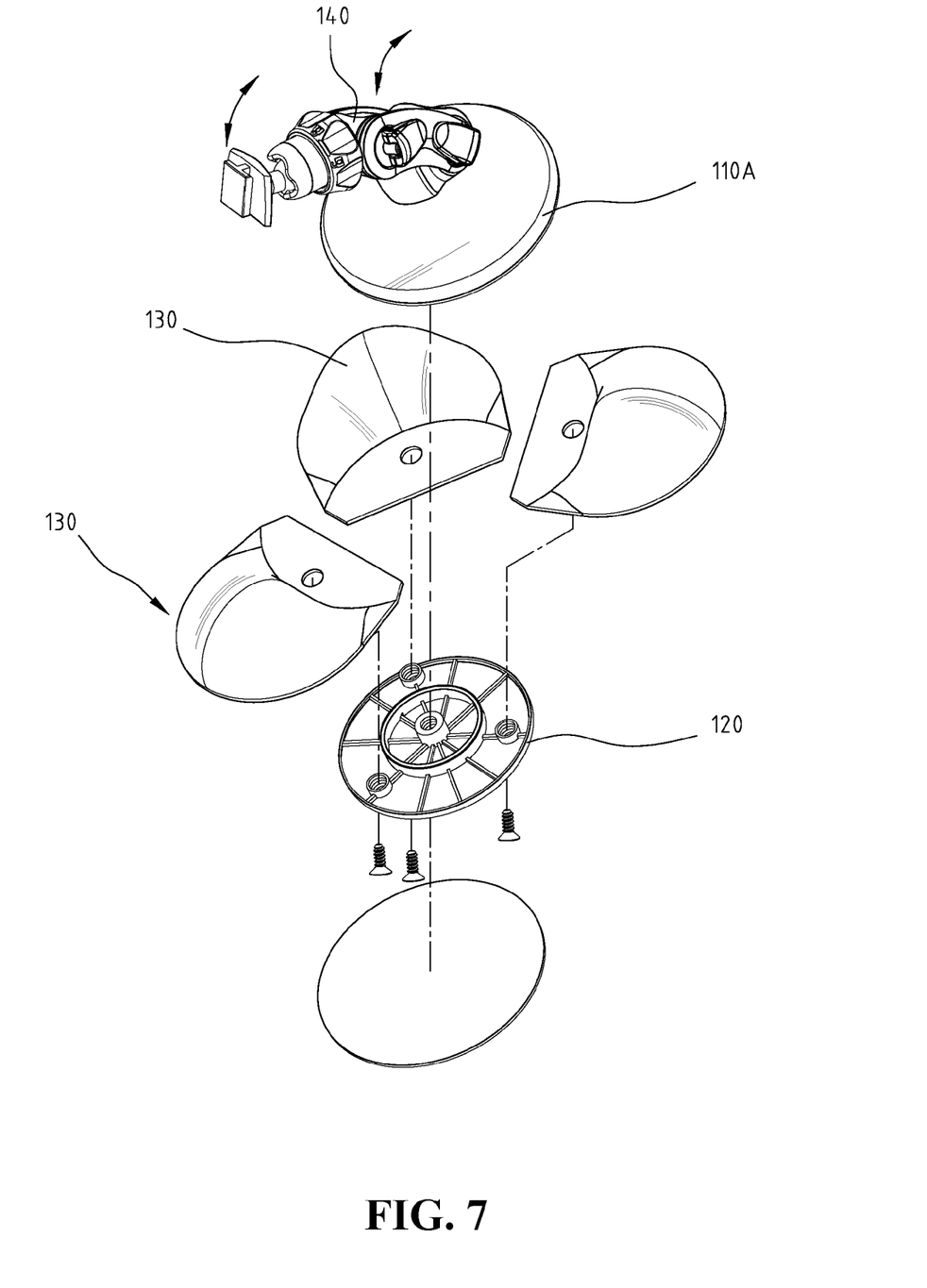
FIG. 7 shows an exploded view of the second embodiment of the present invention.
Figure 8:
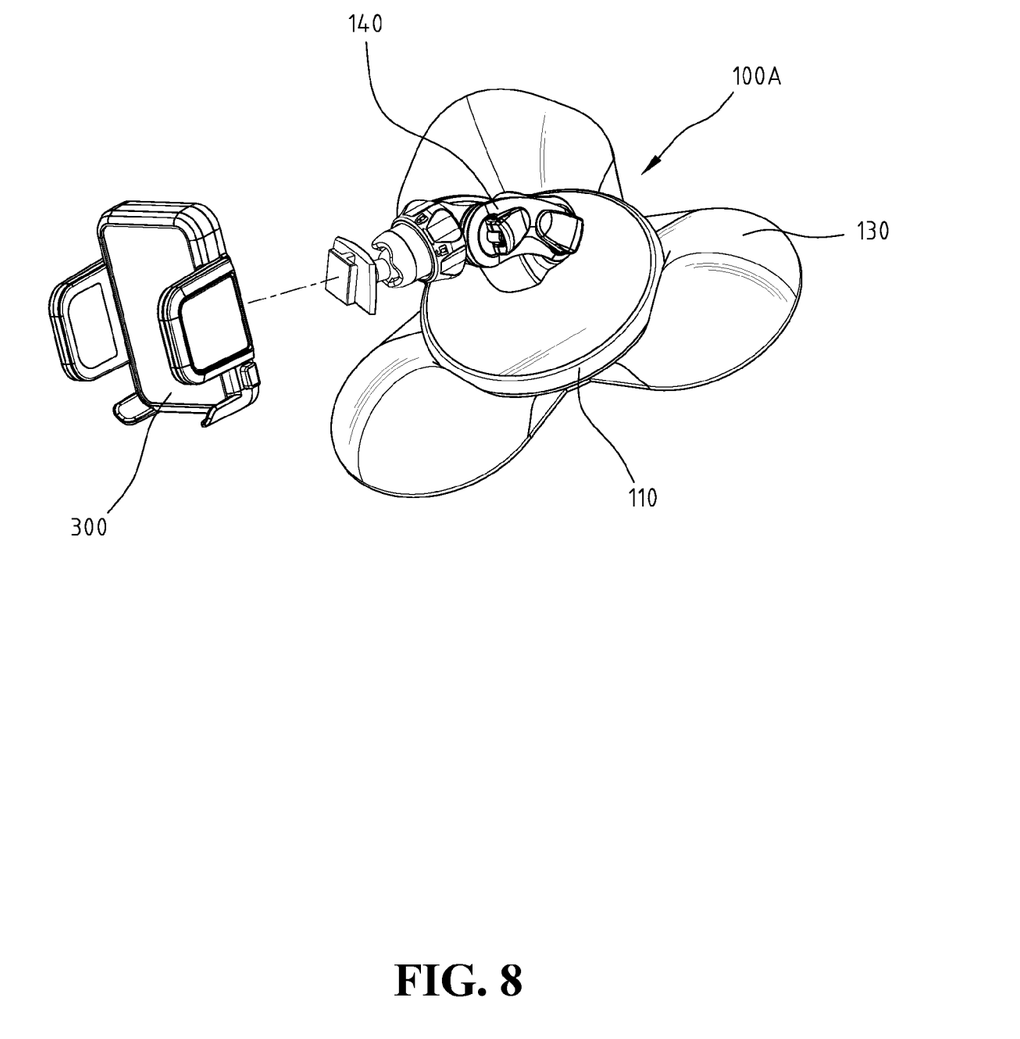
FIG. 8 shows an actual application of the second embodiment of the present invention.

FIGS. 7 & 8 show the exploded view and the actual application of the second embodiment of the present invention respectively. The second embodiment differs from the first embodiment in the structure of connection unit 110A. As shown in FIG. 7, base apparatus 100A includes a connection unit 110A, a fixed unit 120 and at least a weight unit 130. When assembled, weight units 130 are clapped and surround the boundaries of connection unit 110A and fixed unit 120. In this embodiment, the upper part of connection unit 110A includes a link joint set 140. Linkjoint set 140 can be adjusted to form a certain position and angle. In use, link joint set 140 provides the engagement to a clapper 300 for clapping electronic device. It is obvious that the connection unit of the present invention is not limited to any specific type. Any structure that can provide an engagement mechanism, such as a flat platform or a link joint set, to connect a device clapper or holder can be used as connection unit of the present invention.

Figure 9:
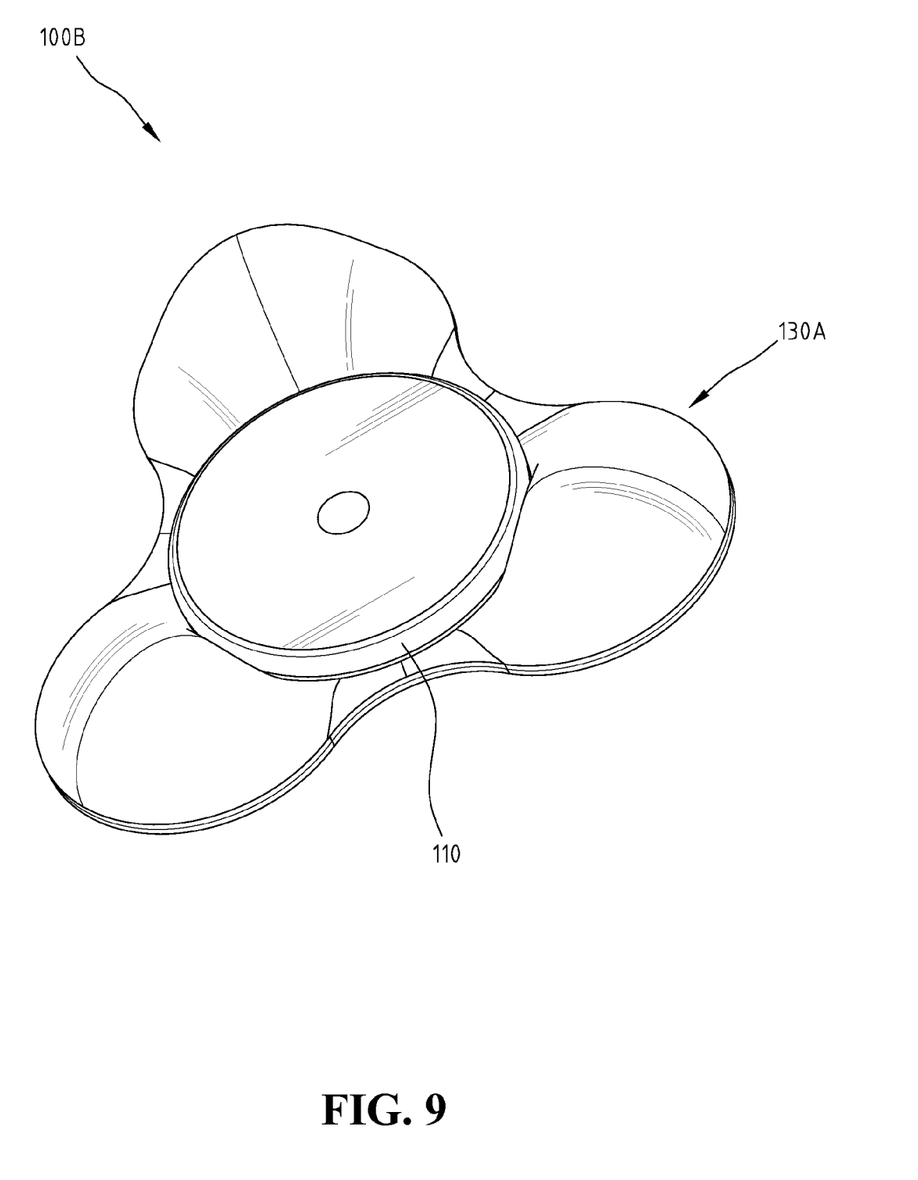
FIG. 9 shows a three-dimensional view of the third embodiment of the present invention.
Figure 10:
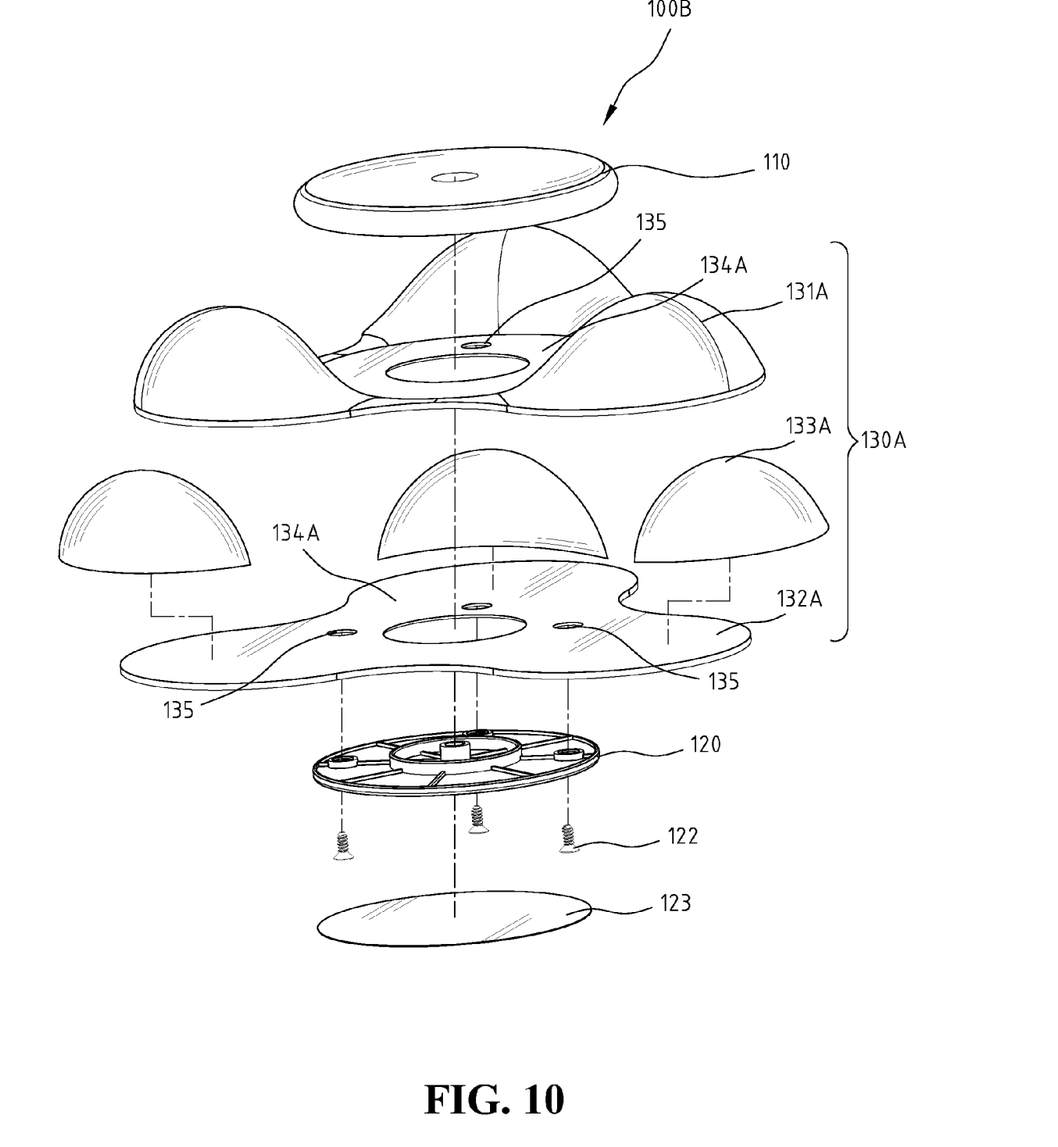
FIG. 10 shows an exploded view of the third embodiment of the present invention.

FIGS. 9 and 10 show the three-dimensional view and the exploded view of the third embodiment of the present invention, respectively. As shown in FIG. 9, base apparatus 100B differs from the first embodiment in the structure of weight units 103A. In the present embodiment, there is only a weight unit 130A, including a wrap means 131A, an anti-slip means 132A and at least a weight object 133A. The boundaries of wrap means 131A and anti-slip means 132A are engaged to form a plurality of independent spaces, with each space for accommodating at least a weight object 133A. Engagement segment 134A of weight unit 130A is a ring shape located at the center area. Engagement segment is still formed by the parts of wrap means 131A and anti-slip means 132A, with a plurality of alignment holes on the surface. The assembly is similar to the previous embodiment. The difference is that weight unit 130A uses the ring-shape engagement segment to be clamped inside the rim of connection unit 110. Finally, screws are used to fastened connection unit 110 and fixed unit 120. This embodiment has the advantage of easy manufacturing and assembly.

In summary, the base apparatus of the present invention is to include a plurality of weight units surrounding the engaged part of connection unit and fixed unit. The weight units include weight objects and anti-slip bottom so that place the base apparatus is placed on top of the dashboard, the base apparatus will remain unmoved so as to provide a connection platform to connecting a support rod or device holder for holding electronic device in a car.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A base apparatus for a device holder or a support rod for holding devices, comprising:
    a connection unit, a lower part of said connection unit including at least an alignment column;
    a fixed unit engaged to a bottom of said connection unit;
    at least a weight unit including
        a wrap means,
        an anti-slip means made of a soft material, a majority of respective boundaries of said wrap means and said anti-slip means being engaged together to form a space,
        at least a weight object accommodated within the space, and
        an engagement segment formed by the engaged boundaries of said wrap means and said anti-slip means, said engagement segment being clamped between said fixed unit and said connection unit, said engagement segment having at least an alignment hole, wherein when said engagement segment is fixed inside a rim of said connection unit and said fixed unit, said alignment column is inserted inside said alignment hole.

2. The base apparatus as claimed in claim 1, wherein said fixed unit further comprises a layer of anti-slip patch at a bottom thereof.

3. The base apparatus as claimed in claim 1, wherein said weight object is a material having considerable weight, and said material is sand, gravel or iron.

4. The base apparatus as claimed in claim 1, wherein weight unit is a bag containing sand, gravel, iron blocks, iron powder, or any combination thereof.

5. The base apparatus as claimed in claim 1, wherein a plurality of said weight units is arranged to surround respective boundaries of said connection unit and said fixed unit.

6. The base apparatus as claimed in claim 1, wherein when a number of said weight unit is one, a center area of said weight unit forms the engagement segment in a ring shape for being fixed inside the rim of said connection unit and said fixed unit.

7. The base apparatus as claimed in claim 1, wherein an upper surface of said connection unit is a flat platform to provide the attachment of a sucker.

8. The base apparatus as claimed in claim 1, wherein an upper surface of said connection unit further comprises a link joint set to provide engagement to the device holder for holding an electronic device.

9. The base apparatus as claimed in claim 1, wherein said connection unit provides an engagement for the device holder for holding an electronic device.

* * * * *